US012789907B2

(12) United States Patent
Hidaka et al.

(10) Patent No.: US 12,789,907 B2
(45) Date of Patent: Nov. 10, 2026

(54) PASSENGER TRANSPORT VEHICLE

(71) Applicant: KAWASAKI MOTORS, LTD., Akashi (JP)

(72) Inventors: Kota Hidaka, Akashi (JP); Hidefumi Yasuhara, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 524 days.

(21) Appl. No.: 18/452,648

(22) Filed: Aug. 21, 2023

(65) Prior Publication Data

US 2024/0182118 A1 Jun. 6, 2024

Related U.S. Application Data

(63) Continuation-in-part of application No. 18/061,023, filed on Dec. 2, 2022, now abandoned.

(51) Int. Cl.
*B62D 25/07* (2006.01)

(52) U.S. Cl.
CPC .................................... *B62D 25/07* (2013.01)

(58) Field of Classification Search
CPC ........ B62D 25/06; B62D 25/07; B60J 7/0084; Y10S 280/05
USPC ..................... 296/213, 210, 208; 280/DIG. 5
See application file for complete search history.

(56) References Cited

U.S. PATENT DOCUMENTS 6,186,584 B1 * 2/2001 Samuelson ................ B60J 7/08 296/213
6,464,291 B2 10/2002 Hynds et al.
11,407,451 B1 * 8/2022 Zaremba ................. B60R 11/00
2002/0014790 A1 * 2/2002 Hynds ........................ B60J 7/08 296/213
2005/0116517 A1 * 6/2005 Fujihara ................... B60N 2/36 297/243
2007/0152463 A1 7/2007 Hardy et al.
2009/0108636 A1 * 4/2009 Hanson .............. B62D 33/0625 296/213
2009/0167062 A1 * 7/2009 Greif ...................... B60J 7/0061 296/213
2018/0099548 A1 * 4/2018 Held ...................... B60J 5/0487
2024/0317033 A1 * 9/2024 Matsushita ............ B60J 7/0084
2025/0270788 A1 * 8/2025 Prokopowicz ......... B62D 33/06
2025/0368271 A1 * 12/2025 Nickle .................. B62D 25/07

FOREIGN PATENT DOCUMENTS

JP 2012030605 A * 2/2012

* cited by examiner

*Primary Examiner* — Wenwei Zhuo
(74) *Attorney, Agent, or Firm* — Muncy, Geissler, Olds & Lowe, P.C.

(57) ABSTRACT

A passenger transport vehicle includes: a body; and a roof on which a drainage gutter and a drainage hole are formed, the roof being supported above the body and including an upper surface and a lower surface, the drainage gutter including a front portion in front of a center of the upper surface in a forward and backward direction, the drainage hole being formed on the front portion to reach the lower surface from a bottom of the drainage gutter.

14 Claims, 6 Drawing Sheets

PASSENGER TRANSPORT VEHICLE

BACKGROUND OF THE INVENTION

Field of the Invention

The present disclosure relates to a passenger transport vehicle.

Description of the Background Art

US2007/0152463A1 discloses a technology for draining water on a roof to a back portion of a golf cart through a support device disposed behind a seat back.

SUMMARY

This passenger transport vehicle includes: a body; and a roof on which a drainage gutter and a drainage hole are formed, the roof being supported above the body and including an upper surface and a lower surface, the drainage gutter including a front portion in front of a center of the upper surface in a forward and backward direction, the drainage hole being formed on the front portion to reach the lower surface from a bottom of the drainage gutter.

This passenger transport vehicle facilitates draining water on the roof toward the front of the vehicle.

The objects, features, aspects, and advantages of this disclosure will become more apparent from the following detailed description and the accompanying drawings.

DESCRIPTION OF THE PREFERRED EMBODIMENTS

Embodiment

Figure 1:
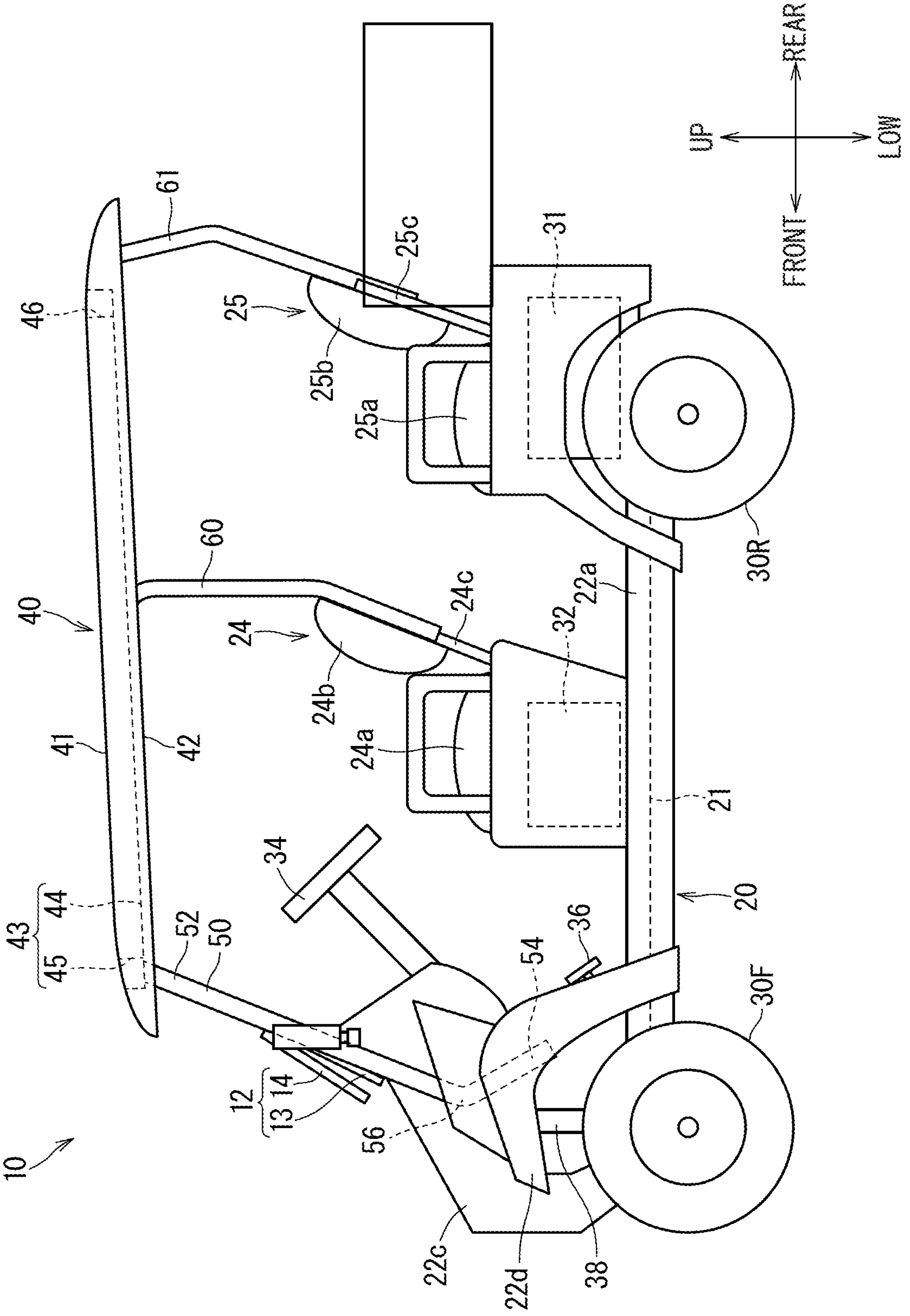
FIG. 1 is a side view illustrating a passenger transport vehicle.

A passenger transport vehicle according to an embodiment will be hereinafter described. FIG. 1 is a side view illustrating a passenger transport vehicle 10. In the following description, traveling directions of the passenger transport vehicle 10 may be expressed as forward, backward opposite to the forward direction, downward toward road surfaces on which the passenger transport vehicle 10 travels, and upward opposite to the downward direction. The right and left may be referred to while a person stands on a road surface and faces forward. The right-left direction is a vehicle-width direction.

Here, the passenger transport vehicle 10 is a vehicle designed to travel at low speeds within a limited area.

The passenger transport vehicle may be an off-road vehicle. The off-road vehicle is a versatile small vehicle suitable for off-road travel rather than for fast travel on a public road.

The off-road vehicle may be a side-by-side vehicle, for example.

The side-by-side vehicle is a small vehicle suitable for all terrain travel, and is a vehicle that occupants can be seated side by side, for example. The side-by-side vehicle may be a multipurpose off-highway utility vehicle (MOHUV) defined by ANSI/OPEI B71.9-2016 or a recreational off-highway vehicle defined by ANSI/ROHVA 1-2016.

Examples of the limited area may include limited community areas, private roads, and private lands (e.g., golf courses and parks). The limited community areas are areas provided for use by community residents. The community areas are areas including, for example, houses and public facilities (e.g., schools and hospitals), and are areas in which the passenger transport vehicle 10 designed to travel through non-public highways are permitted to travel at low speeds. The low speeds are, for example, speeds with upper limits ranging from 20 mph to 30 mph. The passenger transport vehicles 10 include vehicles in accordance with ANSI/ILTVA Z135, and golf carts in accordance with ANSI/ILTVA Z130.1. Furthermore, the passenger transport vehicles include personal transportation electric vehicles.

The passenger transport vehicle 10 may be a single-passenger vehicle or a multi-passenger vehicle. The passenger transport vehicle 10 may have only a seat or seats in a forward and backward direction. The passenger transport vehicle 10, which is a vehicle designed to travel at low speeds through private roads that are non-public highways or through private lands, may have open right and left passenger entrances to seats without being obstructed by walls or doors to facilitate loading or unloading passengers. Here, the passengers can walk past in a lateral direction without being obstructed by doors or walls.

[Overall Structure of Passenger Transport Vehicle]

The passenger transport vehicle 10 includes a body 20 and a roof 40. In this embodiment, the passenger transport vehicle 10 further includes seats 24 and 25, a traveling mechanism, and a driving operation mechanism.

The body 20 may have a frame structure or a monocoque structure. This embodiment is described under the assumption that the body 20 has a frame structure. The body 20 includes a frame 21 and panels. The frame 21 is structured by combining, for example, metallic pipe components, sheet metal components, or cast components. The panels cover the frame 21 and various components supported by the frame 21. The panels give the appearance of the passenger transport vehicle 10, or partition spaces in the passenger transport vehicle 10. Examples of the panels include a floor panel **22*a*, a dash panel 22*b* (see FIG. 6), a hood 22*c*, and fenders 22*d*. The floor panel 22*a* is located at the bottom of space for passengers. The dash panel 22*b* is in front of the space for passengers. The hood 22*c* is in front of the dash panel 22*b*. The fenders 22*d* are located at outside portions of the hood 22*c*** in the lateral direction.

Each of the seats 24 and 25 is a part on which a passenger is to be seated. The seats 24 and 25 are located between the floor panel **22*a* and the roof 40. The seats 24 and 25 are supported by the body 20. The seats 24 and 25 are at a distance from each other in the forward and backward direction. The seat 24 is in front of the seat 25. The seat 24 includes a seat cushion 24*a*, a back rest cushion 24*b*, and a seat frame 24*c*. Similarly, the seat 25 includes a seat cushion 25*a*, a back rest cushion 25*b*, and a seat frame 25*c*. The seat frames 24*c* and 25*c* can be considered as parts of the frame 21 in the body 20. Outside right and left portions of the seats 24 and 25 are openings through which passengers get on and off the passenger transport vehicle 10. The passenger transport vehicle 10** is intended to normally travel with the openings being open and not being closed by, for examples, doors.

The traveling mechanism is a mechanism for traveling of the passenger transport vehicle 10, and includes wheels 30F and 30R, a traveling motor 31, and a power transmission device. Transmission of rotation drive force of the traveling motor 31 to the wheels 30F and 30R through the power transmission device allows the passenger transport vehicle 10 to travel. This embodiment describes an example in which the passenger transport vehicle 10 includes the four wheels 30F and 30R. The passenger transport vehicle may include three or six wheels. The structure of the power transmission device is any. The power transmission device may include, for example, a transmission and a drive shaft.

The wheels 30F and 30R include the front wheels 30F and the rear wheels 30R. The two front wheels 30F are rotatable around its own central axis and are supported to be rotatable around a steering axis, at right and left front portions of the body 20. The two rear wheels 30R are supported to be rotatable around its own central axis at right and left rear portions of the body 20.

In this embodiment, the traveling motor 31 is an electric motor that converts electric energy into rotational motion for traveling. Here, the passenger transport vehicle 10 includes a traveling battery 32 for supplying the electric energy to the traveling motor 31. For example, the traveling battery 32 is supported at a lower portion of the seat 24, and the traveling motor 31 is supported at a lower portion of the seat 25. As described in this embodiment, the passenger transport vehicle 10 including the traveling motor 31 that is an electric motor is an electric passenger transport vehicle. The traveling motor 31 may be an internal combustion engine that burns fuel in a combustion chamber and generates power for traveling through expansion of gases from the burnt fuel. Here, the passenger transport vehicle should include a fuel tank. The positions of the traveling motor 31 and the traveling battery 32 are any.

The driving operation mechanism is a mechanism for receiving a driving operation from the driver, and includes, for example, a steering wheel 34 and a pedal 36. The operation of the steering wheel 34 by the driver enables the front wheels 30F to rotate around the steering axis. The driver can operate an accelerator and a brake through operations of the pedal 36. The steering wheel 34 and the pedal 36 are in front of the seat 24. The driver seated on the seat 24 can operate the steering wheel 34 and the pedal 36. For example, the steering wheel 34 protrudes behind an instrument panel. The pedal 36 protrudes behind the dash panel 22*b*. An accelerator pedal and a brake pedal that are separated from each other may be provided as the pedal 36, or one pedal that can operate both of the accelerator and the brake may be provided as the pedal 36.

The roof 40 is made of a resin or a metal, and is supported above the body 20. The roof 40 spreads in the forward and backward direction and the lateral direction to cover above the seats 24 and 25. In this embodiment, the roof 40 is supported by struts 50, 60, and 61. The struts 50, 60, and 61 extend in a vertical direction. Upper portions of the struts 50, 60, and 61 support the roof 40, and lower portions of the struts 50, 60, and 61 are supported by the body 20. In this embodiment, the struts 50, 60, and 61 are pipes. The pipes are circular in cross section. The pipes may be square in cross section. The pipes may be made of a resin or a metal as long as they have the rigidity allowing to support the roof 40. The pipes may be wide flange beams, or components except pipes, such as bar components that are not interiorly hollowed.

In this embodiment, the struts 50, 60, and 61 include the front struts 50, the middle struts 60, and the rear struts 61. The front struts 50 extend upward from right and left portions in front of the seat 24 in the body 20. The middle struts 60 extend upward from the seat frame 24*c*. The rear struts 61 extend upward from the seat frame 25*c*.

The number of the struts 50, 60, and 61, and the positions at which the struts 50, 60, and 61 are supported are any. For example, the middle struts 60 may be omitted. For example, the middle struts 60 and the rear struts 61 may be supported by parts different from the seat frame 24*c* and the seat frame 25*c*, respectively. The middle struts 60 may extend upward from outward lateral portions of the seat 24.

In the present disclosure, the passenger transport vehicle 10 includes a drainage structure for draining water falling on the roof 40 from above the passenger transport vehicle 10 to a front portion of the passenger transport vehicle 10.

[Upper Portion of Drainage Structure]

Figure 2:
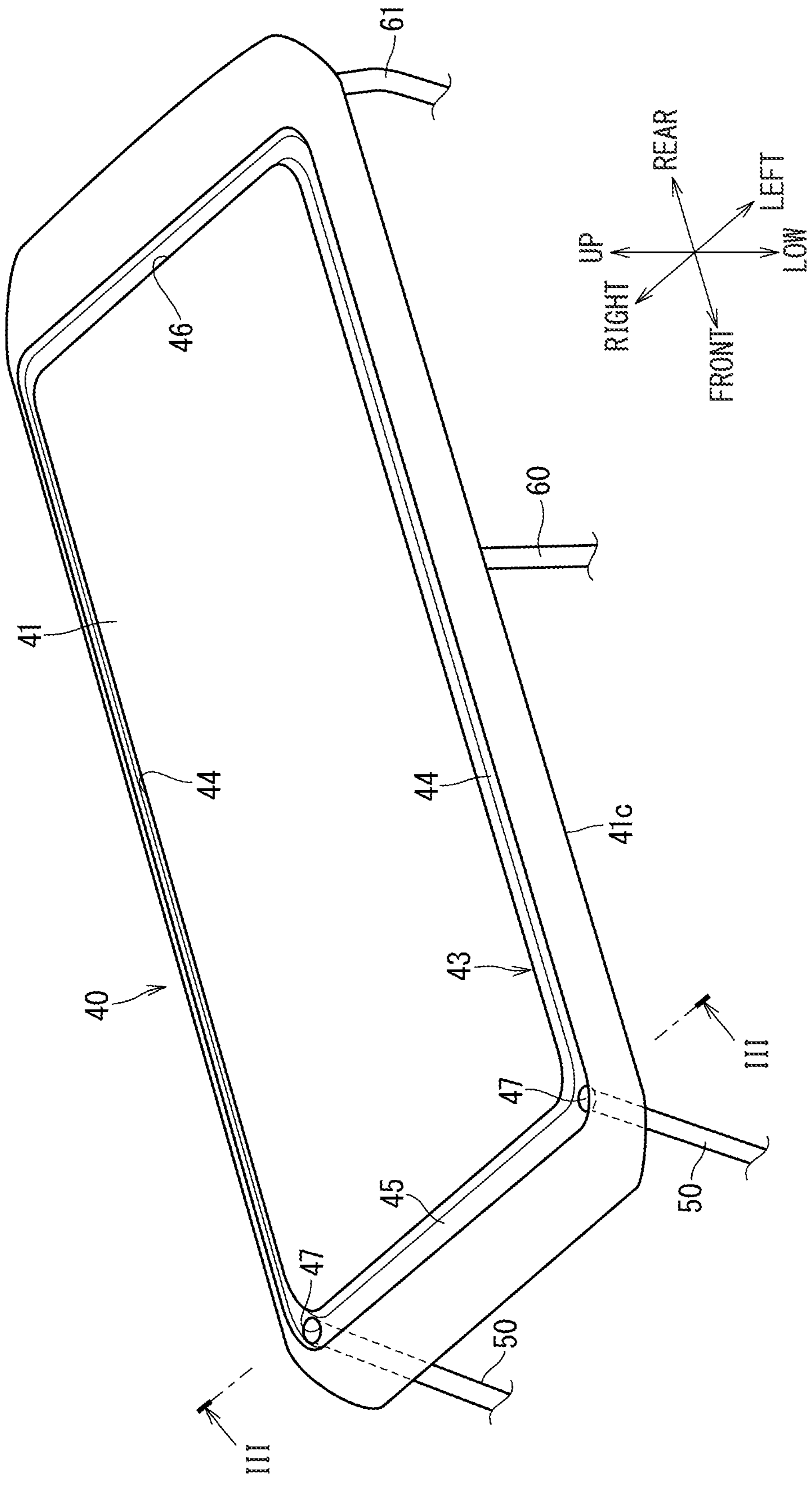
FIG. 2 is a perspective view illustrating the upper portion of the passenger transport vehicle.
Figure 3:
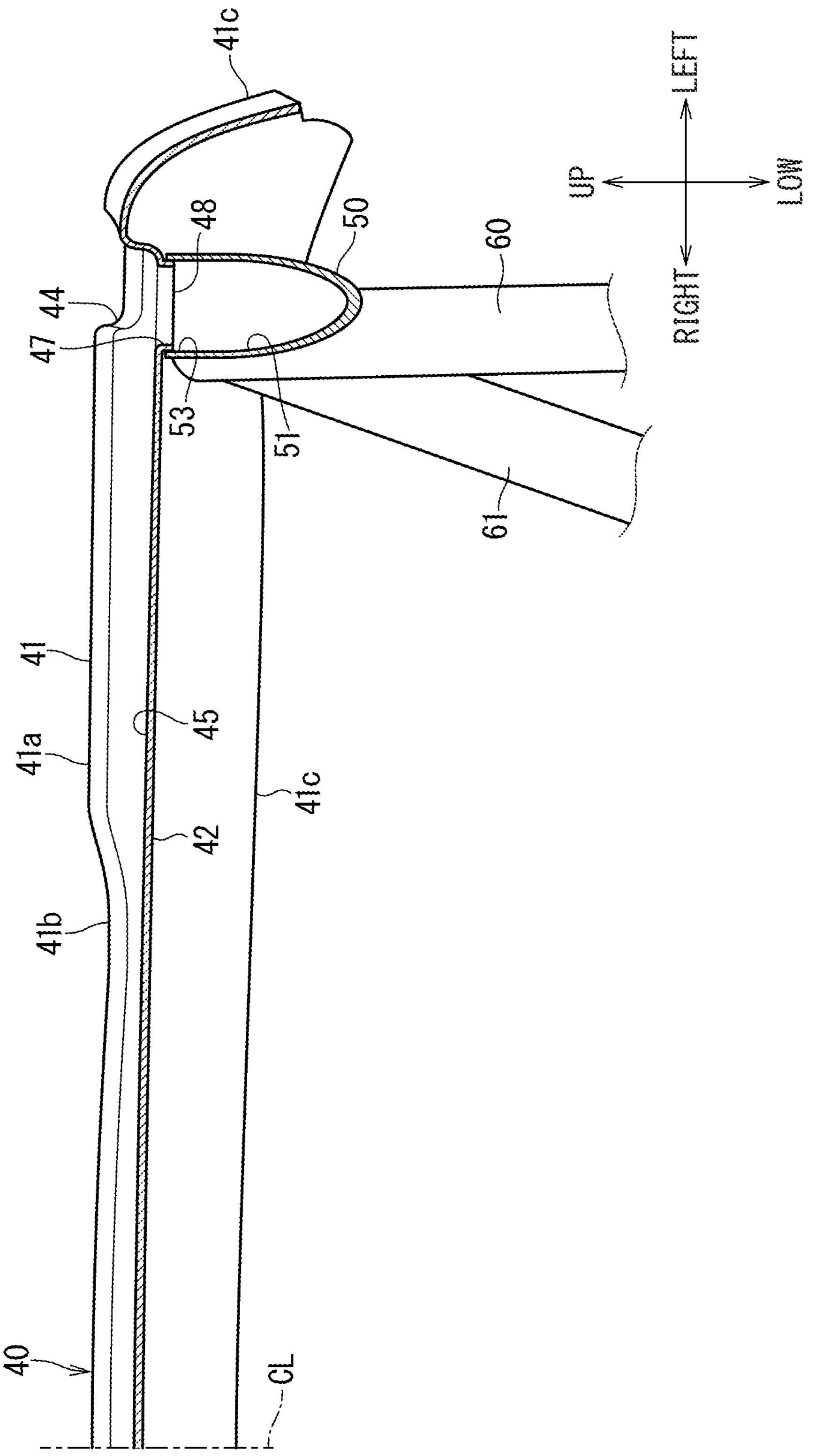
FIG. 3 illustrates a cross-sectional view taken along the line III-III of FIG. 2.

The upper portion of the drainage structure will be specifically described further with reference to FIGS. 2 and 3. FIG. 2 is a perspective view illustrating the upper portion of the passenger transport vehicle 10. FIG. 3 illustrates a cross-sectional view taken along the line III-III of FIG. 2. In FIG. 3, an alternate long and short dashed line CL is a center line passing through a center of the roof 40 in the width direction. FIG. 3 illustrates a left half of the roof 40 with respect to the center line CL, and omits the right half. The right half omitted in FIG. 3 should be symmetric with the left half with respect to the center line CL. The right half need not be symmetric with the left half with respect to the center line CL.

The roof 40 includes an upper surface 41 and a lower surface 42. As illustrated in FIG. 2, the roof 40 is of a rectangular shape longer in the forward and backward direction than in the lateral direction in a plan view. A drainage gutter 43 and drainage holes 47 are formed on the roof 40. The drainage gutter 43 includes a front portion on the upper surface 41 in front of the center in the forward and backward direction. The drainage holes 47 are formed in the front portion of the drainage gutter 43 to reach the lower surface 42 from the bottom of the drainage gutter 43.

In this embodiment, the drainage gutter 43 includes forward-backward ditches 44 and a front ditch 45. The forward-backward ditches 44 extend in the forward and backward direction on the upper surface 41. The front ditch 45 extends to the right and left at a front side of the upper surface 41. The front ditch 45 is connected to the forward-backward ditches 44. The front portion of the drainage gutter 43 includes front portions of the forward-backward ditches 44 and the front ditch 45. The drainage holes 47 are formed in the front portions of the forward-backward ditches 44 or in the front ditch 45. In this embodiment, the drainage holes 47 are at intersections between the forward-backward ditches 44 and the front ditch 45. The intersections between the forward-backward ditches 44 and the front ditch 45 can be regarded as portions of the forward-backward ditches 44 or portions of the front ditch 45. Thus, the drainage holes 47 can be regarded as being in the forward-backward ditches 44 or in the front ditch 45.

As illustrated in FIG. 1, the forward-backward ditch 44 is of a shape falling frontward. This moves water flowing along the forward-backward ditches 44 toward the drainage holes 47 at the front of the forward-backward ditches 44 under its own weight.

The forward-backward ditches 44 are located closer to outside portions than to the center of the upper surface 41 in the lateral direction. Thus, the drainage holes 47 at the intersections between the forward-backward ditches 44 and the front ditch 45 can be regarded as being located at positions closer to the outside portions of the front ditch 45 in the lateral direction. As illustrated in FIG. 3, the front ditch 45 is of a shape falling outward in the lateral direction. This moves water flowing along the front ditch 45 toward the drainage holes 47 at the outside portions of the front ditch 45 in the lateral direction under its own weight.

In this embodiment, the drainage gutter 43 includes the two forward-backward ditches 44. One of the two forward-backward ditches 44 is located to the left of the center of the upper surface 41 in the lateral direction, whereas the other is located to the right of the center of the upper surface 41 in the lateral direction. The front ditch 45 is of a shape falling from the intermediate portion in the lateral direction toward outside right and left portions in the lateral direction.

Furthermore, the drainage gutter 43 further includes a rear ditch 46. The rear ditch 46 extends to the right and left behind the upper surface 41. The rear ditch 46 is connected to the forward-backward ditches 44. The drainage gutter 43 with the front ditch 45, the two forward-backward ditches 44, and the rear ditch 46 is ring-shaped along an outer edge 41*c* of the roof 40. Front ends of the forward-backward ditches 44 are connected to ends of the front ditch 45. The front ends of the forward-backward ditches 44 may protrude forward over the front ditch 45. The ends of the front ditch 45 may protrude outward over the forward-backward ditches 44 in the lateral direction. Furthermore, rear ends of the forward-backward ditches 44 are connected to ends of the rear ditch 46. The rear ends of the forward-backward ditches 44 may protrude backward over the rear ditch 46. The ends of the rear ditch 46 may protrude outward over the forward-backward ditches 44 in the lateral direction.

As illustrated in FIG. 3, the upper surface 41 of the roof 40 has a portion inclined upward toward the forward-backward ditch 44 from the center in the width direction. The upper surface 41 of the roof 40 includes an upper portion 41*a* and a lower portion 41*b* that are different in height between the center in the width direction and the forward-backward ditch 44. The upper portion 41*a* is higher than the lower portion 41*b*. The upper portion 41*a* is located outside the lower portion 41*b* in the lateral direction. On the upper surface 41 of the roof 40, a part of water flowing through a portion between the two forward-backward ditches 44 flows toward the forward-backward ditches 44 through the upper portions 41*a*, and another part thereof flows toward the front ditch 45 through the lower portions 41*b*. On the upper surface 41 of the roof 40, water flowing through a portion between the upper portion 41*a* and the forward-backward ditch 44 located outside the upper portion 41*a* in the lateral direction flows toward the forward-backward ditch 44 through the upper portion 41*a*. Water flowing through the two lower portions 41*b* and a portion between the lower portions 41*b* on the upper surface 41 of the roof 40 flows toward the front ditch 45 through the lower portions 41*b*.

As illustrated in FIG. 3, the front ditch 45 is of a shape continuously falling from the center in the lateral direction toward the forward-backward ditch 44. Thus, a sidewall of the front ditch 45 in the lower portion 41*b* is lower than that of the front ditch 45 in the upper portion 41*a*. The upper surface 41 of the roof 40 need not include the upper portions 41*a* and the lower portions 41*b*. The upper surface of the roof may be of a shape continuously falling from the center in the lateral direction toward the forward-backward ditches 44, similarly to the front ditch 45.

The two forward-backward ditches 44 are located slightly inside the outer edge 41*c* at the right and left ends of the upper surface 41, on the upper surface 41 of the roof 40. The front ditch 45 is located slightly behind the outer edge 41*c* at a front end of the upper surface 41. The rear ditch 46 is located slightly in front of the outer edge 41*c* at a rear end of the upper surface 41. An outside portion of the drainage gutter 43 on the upper surface 41 of the roof 40 is of a shape falling toward the outer edge 41*c*. The outside portion of the drainage gutter 43 on the upper surface 41 of the roof 40 need not be of the shape falling toward the outer edge 41*c*.

The passenger transport vehicle 10 further includes the drainage channels 50. The drainage channels 50 extend from the drainage holes 47 to the lower portions 54 in the body 20. Upper portions 52 of the drainage channels 50 are connected to the drainage holes 47. Each of the drainage channels 50 includes space functioning as a water channel, and a wall surrounding the space. Water flows through the space along the wall. The wall may be of a ring shape surrounding the entire periphery of the space. The wall may be grooved to surround a part of the periphery of the space.

In this embodiment, the front struts 50 are the drainage channels 50. The internal space of the tubular front strut 50 is space of the drainage channel 50. An inner surface 51 of the tubular front strut 50 is a wall of the drainage channel 50. The wall is of a ring shape surrounding the entire periphery of the space. The front strut 50 includes the upper portion 52 and the lower portion 54. The upper portion 52 includes an upper opening 53. The lower portion 54 includes a lower opening 55. The upper opening 53 is connected to the drainage hole 47. The upper opening 53 is provided at an upper end of the front strut 50. The lower opening 55 is provided at a lower end of the front strut 50. The upper opening 53 is an opening at the upper end of a pipe that is the front strut 50, and the lower opening 55 is an opening at the lower end of the pipe.

A connection portion between the drainage hole 47 and the upper opening 53 should have a water blocking structure to prevent water leakage. The water blocking structure may be, for example, a structure covering the outer periphery of a ring-shaped rib 48 protruding downward from the outer edge of the drainage hole 47 with the outer edge of the upper opening 53 on the lower surface 42 as illustrated in FIG. 3. The water blocking structure may be, for example, packing provided between the outer edge of the upper opening 53 and the outer edge of the drainage hole 47.

The forward-backward ditches 44 are of a shape falling frontward. The upper portions 52 of the drainage channels 50 extend forward and downward from the drainage holes 47. As illustrated in FIG. 1, the drainage channel 50 is inclined in the vertical direction and in the lateral direction. The upper ends of the front struts 50 are inclined with respect to a vertical direction.

When the roof 40 is observed along the lateral direction, the roof 40 has a forward-tilted shape or a horizontal shape. A front portion of the roof 40 is lower than a rear portion thereof. The forward-backward ditches 44 having almost the same depth and being continuous in the forward and backward direction on the upper surface 41 of the roof 40 with the forward-tilted shape may be of a shape falling frontward. When the roof 40 has a horizontal shape or a backward-tilted shape, the forward-backward ditches 44 deeper in the front portions than in the rear portions may be of a shape falling frontward.

The right and left front struts 50 separately provided have respective upper ends. The upper ends of the front struts 50 communicate with the drainage holes 47. The right and left front struts 50 may be combined into a strut with a gate shape. This strut with the gate shape may have holes communicating with the drainage holes 47 in the middle portion in an extension direction.

The passenger transport vehicle 10 may have a front guard 12 guarding the front of the seat 24 instead of a front window. The front guard 12 may be a transparent panel molded of, for example, a resin. The front guard 12 may be supported by the front struts 50. A front end of the roof 40 may extend to the position of the front guard 12. The rain falling in front of the front ditch 45 on the roof 40 does not flow toward the front ditch 45 but may drop downward from the front end of the roof 40. With the extension of the front end of the roof 40 to the position of the front guard 12, water dropping downward from the front end of the roof 40 hardly enters the space for passengers. The front guard 12 may have a lower guard 13 and an upper guard 14. The lower guard 13 and the upper guard 14 may be coupled to be rotatable around an axis along the lateral direction. The lower guard 13 may be supported by the front struts 50. The upper guard 14 may overlap the front of the lower guard 13 while being unused. The upper guard 14 may be located above the lower guard 13 when used.

[Lower Portion of Drainage Structure]

Figure 4:
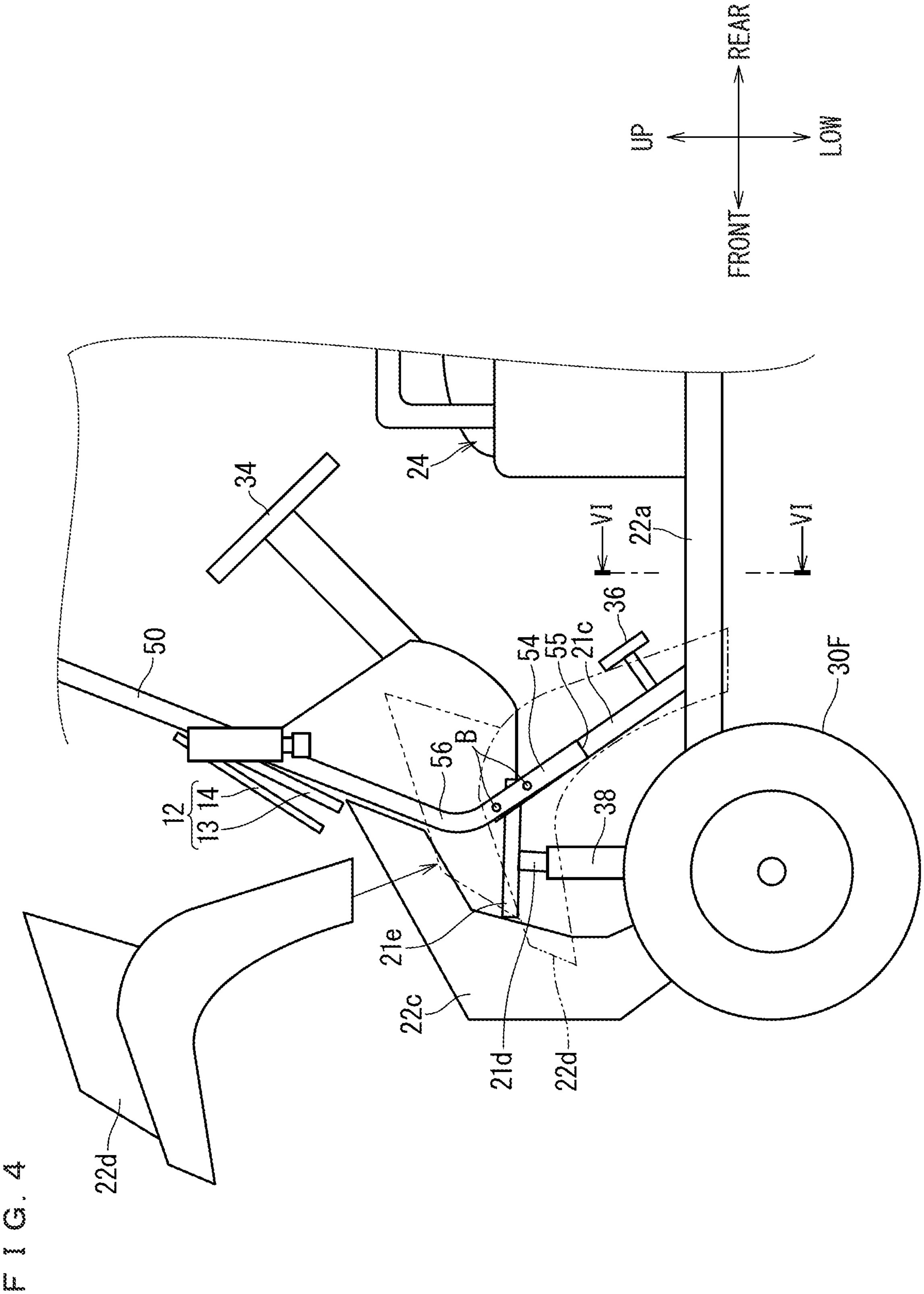
FIG. 4 is a side view illustrating a front lower portion of the passenger transport vehicle.
Figure 5:
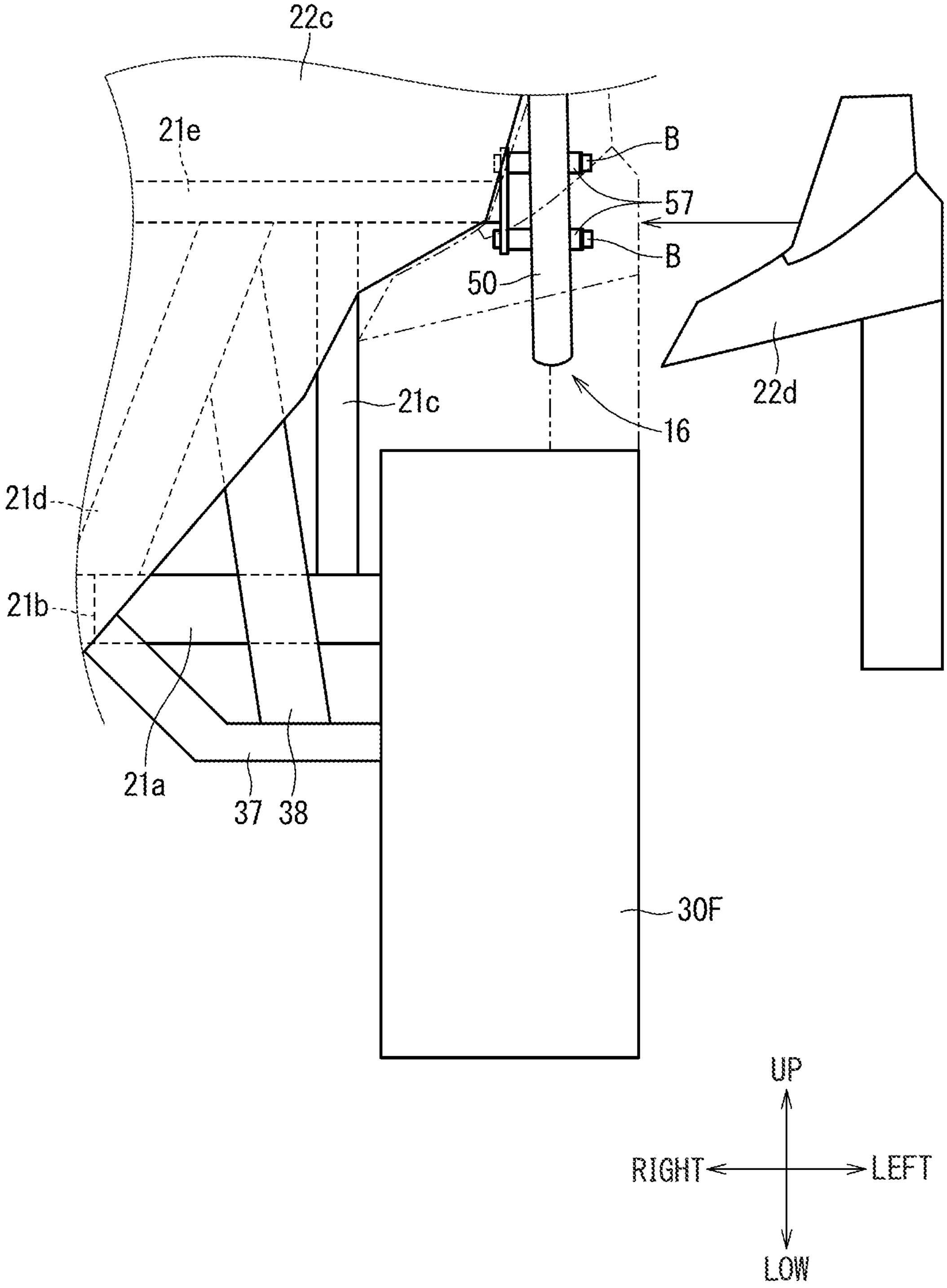
FIG. 5 is a plan view illustrating a left lower portion of the passenger transport vehicle.
Figure 6:
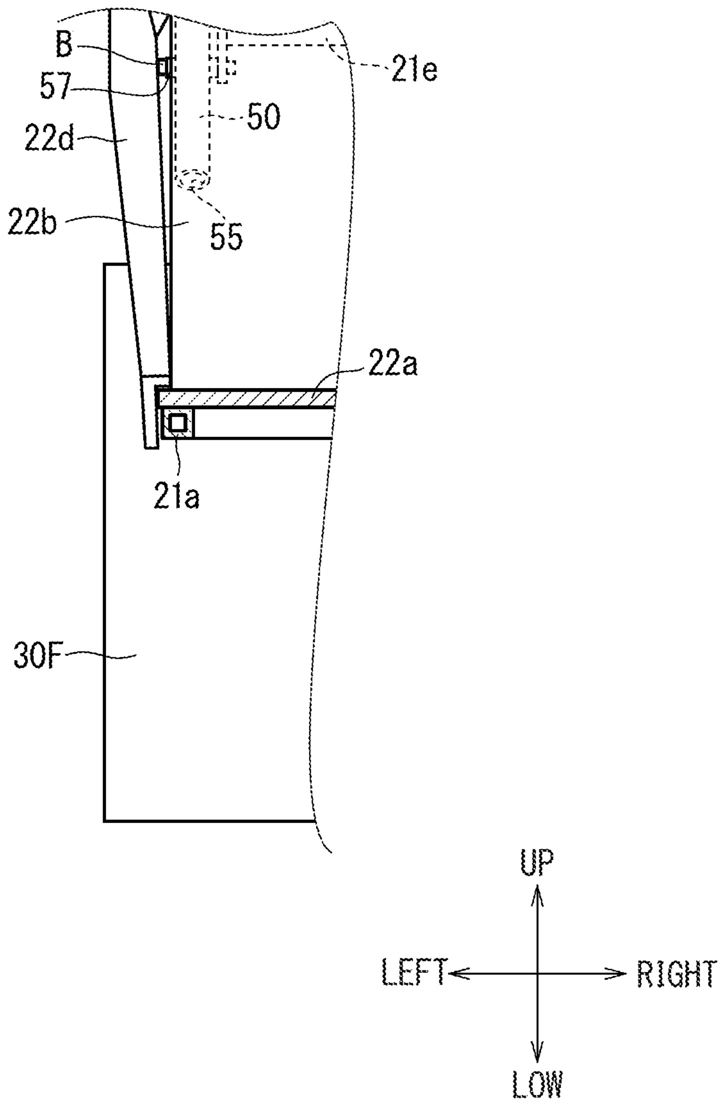
FIG. 6 illustrates a cross-sectional view taken along the line VI-VI of FIG. 4.

FIG. 4 is a side view illustrating a front lower portion of the passenger transport vehicle 10. FIG. 5 is a plan view illustrating a left lower portion of the passenger transport vehicle 10. FIG. 6 illustrates a cross-sectional view taken along the line VI-VI of FIG. 4. FIGS. 4 and 5 illustrate a state where the fender 22*d* drawn in a solid line is removed from the passenger transport vehicle 10. The fenders 22*d* are attached to the positions drawn in imaginary lines in FIGS. 4 and 5.

The drainage channel 50 includes a bent channel 56. In this embodiment, the drainage channel 50 extends downward and forward from the drainage hole 47, and is headed downward and backward through the bent channel 56. The bent channel 56 and the front and rear portions thereof are V-shaped. The bent channel 56 may be of any shape, and may be a bent channel different from what is described above. For example, the drainage channel 50 may extend downward and forward from the drainage hole 47, and may be headed to the center in the lateral direction through the bent channel. Although the single drainage channel 50 includes the single bent channel 56 in this embodiment, one drainage channel may include bent channels.

The drainage channel 50 includes fixation parts 57 for the body 20. The fixation parts 57 are disposed at the lower portion 54 of the drainage channel 50. The fixation parts 57 are disposed below the bent channel 56.

In this embodiment, the lower portion 54 of the front strut 50 is fixed to a front portion of the frame 21. Here, a front structure of the passenger transport vehicle 10 including the front portion of the frame 21 will be more specifically described. The front portion of the frame 21 includes lower frame portions 21*a* and 21*b*, and upper frame portions 21*c*, 21*d*, and 21*e*.

As illustrated in FIG. 6, the lower frame portion 21*a* supports the floor panel 22*a*. The lower frame portion 21*b* is a portion extending forward from the lower frame portion 21*a*, and supports, for example, a knuckle arm 37. The knuckle arm 37 supports the front wheel 30F to be rotatable around its own central axis. The lower frame portion 21*b* supports the knuckle arm 37 so that steering rotation is possible. Coupling the knuckle arm 37 to the steering wheel 34 through, for example, a tie rod, a rack and pinion, and a steering shaft which are not illustrated allows the driver steering rotation of the front wheels 30F through the steering wheel 34.

The upper frame portions 21*c*, 21*d*, and 21*e* are portions extending above the lower frame portions 21*a* and 21*b*. The upper frame portion 21*c* is a portion extending from the lower frame portion 21*a* frontward and upward, and the dash panel 22*b* is disposed along the upper frame portion 21*c*. The upper frame portion 21*d* is a portion extending from the lower frame portion 21*b* upward, and supports, for example, an upper end of a suspension 38. The suspension 38 is a portion that couples the body 20 to the front wheel 30*f* and absorbs vertical vibrations. The upper frame portions 21*e* is a portion that couples upper ends of the upper frame portions 21*c* and 21*d*, and supports, for example, the instrument panel.

In this embodiment, the lower portion 54 of the front strut 50 is fixed to the upper frame portion 21*e*. The upper frame portion 21*e* includes a portion extending to the lateral direction, and the lower portion 54 of the front strut 50 is fixed to an end of the portion extending to the lateral direction. The front strut 50 can be fixed to the upper frame portions 21*e*, for example, through bolts B. The fixation parts 57 for fixing the bolts are formed in the front strut 50. The fixation parts 57 include portions protruding outward from the external surface proper of the front strut 50. Through holes for threading the bolts B are formed in the front strut 50 proper and the fixation parts 57, and the bolts B penetrate the through holes. The two bolts B are disposed at a distance from each other along the extension direction of the front strut 50. The bolts B cross the internal space of the front strut 50. Each of the bolts B closes a part of the fluid channel in the drainage channel 50. The bolts B may be disposed to pass through only outside the internal space of the front struts 50 without passing through the internal space. A fixing structure for the lower portion 54 of the front strut 50 is not limited to that described above. For example, the lower portions 54 of the front struts 50 may be fixed to portions different from the upper frame portions 21*e*. For example, the front struts 50 may be fixed to the upper frame portions 21*e* by, for example, welding.

The lower opening 55 of the drainage channel 50 is in accommodation space 16 accommodating the front wheel 30F. The accommodation space 16 is in front of the lower frame portions 21*a* and the upper frame portions 21*c*. The accommodation space 16 is located outside the lower frame portions 21*b* and the upper frame portions 21*d* in the lateral direction. The accommodation space 16 is located below the upper frame portions 21*e*.

The lower opening 55 is in front of and above the floor panel 22*a*. The body 20 includes a panel covering behind the lower openings 55. The panel functions as a partition between the space with the lower openings 55 and the passenger space. In the example illustrated in FIG. 6, the dash panel 22*b* covers behind the lower openings 55. The panel covering behind the lower openings 55 need not be the dash panel 22*b* but may be another panel, for example, the fenders 22*d*.

The fenders 22*d* are located outside the drainage channels 50 in the lateral direction. When the passenger transport vehicle 10 is observed along the lateral direction as illustrated in FIG. 4, the fender 22*d* hides the bent channel 56 and the fixation parts 57. When the passenger transport vehicle 10 is observed along the lateral direction, the fender 22*d* hides the entire or a part of the lower opening 55. When the passenger transport vehicle 10 is observed from the front as illustrated in FIG. 5, the fender 22*d* hides the bent channel 56 and the fixation parts 57. The fender 22*d* hides the bent channel 56 and most portions lower than the bent channel 56 in the drainage channel 50. The fender 22*d* is disposed to hide the upper end of the upper frame portion 21*d*, and the upper frame portions 21*c* and 21*e*. A rear lower portion of the fender 22*d* extends along the upper frame portion 21*c*.

The drainage channel 50 passes between the hood 22*c* and the fender 22*d*. The drainage channels 50 pass outside the hood 22*c* in the lateral direction. The fenders 22*d* cover outside the drainage channels 50 in the lateral direction. The bent channels 56 are located below the hood 22*c*. The bent channels 56 are located between the hood 22*c* and the fender 22*d*. The hood 22*c* and the fenders 22*d* hide the bent channels 56 and most portions of the lower portions 54 lower than the bent channels 56 in the drainage channels 50. The upper portions 52 higher than the hood 22*c* and the fenders 22*d* in the drainage channels 50 linearly extend toward the roof 40. The bent channel 56 may be disposed in the upper portion 52 higher than the hood 22*c* and the fender 22*d* in the drainage channel 50.

The hood 22*c* and the fenders 22*d* are separate parts. The drainage channels 50 can be attached to the passenger transport vehicle 10 without attaching at least one of the hood 22*c* and the fenders 22*d* to the passenger transport vehicle 10. For example, the front struts 50 can be attached to the frame 21 without attaching the fenders 22*d*. In this embodiment, the struts 50, 60, and 61 are attached to the body 20 with the struts 50, 60, and 61 being integrated with the roof 40.

Advantages

In the passenger transport vehicle 10 with such a structure, the drainage gutter 43 and the drainage holes 47 facilitate draining water on the upper surface 41 of the roof 40 from the front of the roof 40. This facilitates, for example, forming the roof 40 into the forward-tilted shape or the horizontal shape when the passenger transport vehicle 10 is viewed along the lateral direction.

Since the drainage holes 47 are at the front of the forward-backward ditches 44 that are of the shape falling frontward, rear water on the upper surface 41 of the roof 40 tends to gather in the drainage holes 47 through the forward-backward ditches 44.

Furthermore, the drainage holes 47 are located closer to outside portions of the front ditch 45 in the lateral direction, and the front ditch 45 is of the shape falling outward in the lateral direction. Consequently, water in the intermediate portion of the upper surface 41 of the roof 40 in the lateral direction tends to gather in the drainage holes 47 through the front ditch 45.

Furthermore, the drainage holes 47 are at the intersections between the forward-backward ditches 44 and the front ditch 45. This facilitates draining, directly through the drainage holes 47, water flowing through the front ditch 45 and water flowing through the forward-backward ditches 44 without the waters being merged in the drainage gutter 43. This hardly overflows water from the drainage gutter 43.

When the drainage holes 47 are at the intersections between the forward-backward ditches 44 and the front ditch 45, the forward-backward ditches 44 are at the right and left ends of the upper surface 41, and the front ditch 45 is of the shape falling from the intermediate portion in the lateral direction toward outside right and left portions in the lateral direction. Consequently, water in the intermediate portion of the upper surface 41 of the roof 40 in the lateral direction tends to gather in the two right and left drainage holes 47 through the front ditch 45.

The passenger transport vehicle 10 further includes the drainage channels 50 extending from the drainage holes 47 to the lower portions in the body 20. This facilitates flow of water on the roof 40 from the drainage holes 47 to the lower portions in the body 20 through the drainage channels 50.

Furthermore, the inner surface 51 of the front strut 50 is a wall of the drainage channel 50. This saves providing other drainage channels separately from the drainage channels 50, and can prevent an increase in the number of components.

The upper ends of the drainage channels 50 are connected to the drainage holes 47, and the upper ends are inclined with respect to the vertical direction. This facilitates increasing areas of the upper openings 53 of the drainage channels 50 and improving the drainage performance more than those when the upper ends of the drainage channels 50 extend in the vertical direction.

The drainage channel 50 includes the bent channel 56. This can weaken the momentum of water through the drainage channel 50 more than the drainage channel 50 excluding the bent channel 56.

The lower openings 55 of the drainage channels 50 are in space accommodating the front wheels 30F. The body 20 includes the panel 22*b* covering behind the lower openings 55. This hardly allows water drained out of the lower openings 55 of the drainage channels 50 to enter the passenger space, and hardly splashes water onto passengers.

The body 20 further includes the fenders 22*d* located outside the drainage channels 50 in the lateral direction. Consequently, the fenders 22*d* hide the drainage channels 50.

The drainage channel 50 passes between the hood 22*c* and the fender 22*d*. This facilitates disposing the drainage channel 50 extending lower than the hood 22*c* than the drainage channel 50 penetrating through a hole bored in the hood 22*c* or the fender 22*d*.

Furthermore, the drainage gutter 43 includes the forward-backward ditches 44, the drainage holes 47 are at fronts of the forward-backward ditches 44, the forward-backward ditches 44 are of a shape falling frontward, and the upper portion 52 of the drainage channel 50 extends forward and downward from the drainage hole 47. This facilitates moving, into the drainage channels 50, water entering the drainage holes 47 through the forward-backward ditches 44.

A front portion of the roof 40 is lower than a rear portion thereof. Consequently, water on the upper surface 41 of the roof 40 tends to gather toward the front with the drainage holes 47. Furthermore, matching the shape of the drainage gutter 43 with the shape of the roof 40 simply facilitates forming the front portion of the drainage gutter 43 into a shape in which the front portion is lower than the rear portion thereof.

When the roof 40 is observed along the lateral direction, the roof 40 has a forward-tilted shape or a horizontal shape. Consequently, water on the upper surface 41 of the roof 40 tends to gather toward the front with the drainage holes 47. Furthermore, matching the shape of the drainage gutter 43 with the shape of the roof 40 simply facilitates forming the front portion of the drainage gutter 43 into a shape in which the front portion is lower than the rear portion thereof.

Other Modifications

Although the embodiment describes that the drainage gutter 43 includes the front ditch 45 and the forward-backward ditches 44 and that the drainage holes 47 are at the intersections between the forward-backward ditches 44 and the front ditch 45, this structure is not essential. For example, the drainage hole 47 need not include one of the front ditch 45 and the forward-backward ditch 44. For example, even when the drainage gutter 43 includes the front ditch 45 and the forward-backward ditches 44, the drainage holes 47 may be located at positions different from the intersections between the front ditch 45 and the forward-backward ditches 44. For example, the drainage holes 47 need not be in positions along the forward-backward ditches 44 but may be in an intermediate portion of the front ditch 45. For example, the drainage holes 47 need not be in positions along the front ditch 45 but may be in intermediate portions of the forward-backward ditches 44.

Although the embodiment describes that the drainage holes 47 are at the front of the forward-backward ditches 44 that are of the shape falling frontward, this structure is not essential. For example, the forward-backward ditches 44 may be of a horizontal shape or a shape falling rearward in the forward and backward direction. The drainage holes 47 may be disposed at the front and the rear of the roof 40.

Although the embodiment describes that the front ditch 45 is of the shape falling outward in the lateral direction, this structure is not essential. For example, the front ditch 45 may be of a horizontal shape in the lateral direction or a shape falling toward the center in the lateral direction.

Although the embodiment describes that the passenger transport vehicle 10 includes the drainage channels 50, this structure is not essential. The passenger transport vehicle 10 need not include the drainage channels 50. Nothing need not be coupled under the drainage holes 47. Water flowing through the drainage holes 47 may fall toward the bottom of the passenger transport vehicle 10 through the lower surface 42 of the roof 40 and external surfaces of the front struts 50.

Although the embodiment describes that the inner surface 51 of the front strut 50 is a wall of the drainage channel 50, this structure is not essential. A drainage channel may be disposed outside the front struts 50 separately from the front struts 50. For example, a tube may be supported outside the front struts 50 as a drainage channel. The rigidity of the tube may be lower than that of the front struts 50, or lower than that required for supporting the roof 40.

Although the embodiment describes that the upper ends of the drainage channels 50 are connected to the drainage holes 47 and the upper ends are inclined with respect to a vertical direction, this structure is not essential. The upper ends of the drainage channels 50 may extend parallel to the vertical direction.

Although the embodiment describes that the drainage channel 50 includes the bent channel 56, this structure is not essential. For example, the drainage channel 50 need not include the bent channel 56.

Although the embodiment describes that the lower openings 55 of the drainage channels 50 are in space accommodating the front wheels 30F and the body 20 includes the panel 22*b* covering behind the lower openings 55, this structure is not essential. For example, the body 20 need not include a panel covering behind the lower openings 55. For example, the drainage channel 50 may extend up to the lower frame portion 21*a*, and the lower opening 55 may be located below the floor panel 22*a*.

Although the embodiment describes that the body 20 further includes the fenders 22*d* located outside the drainage channels 50 in the lateral direction, this structure is not essential. For example, the drainage channels 50 may be located outside the fenders in the lateral direction.

Although the embodiment describes that the hood 22*c* and the fenders 22*d* are separate parts and the drainage channels 50 pass between the hood 22*c* and the fenders 22*d*, this structure is not essential. The drainage channels 50 may be provided to penetrate through holes bored in the hood or the fenders.

Although the embodiment describes that the forward-backward ditch 44 is of a shape falling frontward and the upper portion 52 of the drainage channel 50 extends forward and downward from the drainage hole 47 at a front of the forward-backward ditch 44, this structure is not essential.

Although the embodiment describes that a front portion of the roof 40 is lower than a rear portion thereof, this structure is not essential. The front portion of the roof 40 may be as high as the rear portion thereof or higher than the rear portion.

Although the embodiment describes that the roof 40 has a forward-tilted shape or a horizontal shape when the roof 40 is observed along the lateral direction, this structure is not essential. When the roof 40 is observed along the lateral direction, the roof 40 may have a backward-tilted shape.

The structures described in the embodiment and the modifications can be appropriately combined unless any contradiction occurs.

Additional Note

This application discloses the following aspects.

A first aspect is a passenger transport vehicle including: a body; and a roof on which a drainage gutter and a drainage hole are formed, the roof being supported above the body and including an upper surface and a lower surface, the drainage gutter including a front portion in front of a center of the upper surface in the forward and backward direction, the drainage hole being formed on the front portion to reach the lower surface from a bottom of the drainage gutter.

In this passenger transport vehicle, the drainage gutter and the drainage holes facilitate draining water on the upper surface of the roof from the front of the roof.

A second aspect is the passenger transport vehicle according to the first aspect, wherein the drainage gutter includes a forward-backward ditch extending in the forward and backward direction on the upper surface, the drainage hole is at a front of the forward-backward ditch, and the forward-backward ditch is of a shape falling frontward. Consequently, rear water on the upper surface of the roof tends to gather in the drainage hole through the forward-backward ditch.

A third aspect is the passenger transport vehicle according to the first or second aspect, wherein the drainage gutter includes a front ditch extending in a lateral direction at a front side of the upper surface, the drainage hole is located closer to an outside portion of the front ditch in the lateral direction, and the front ditch is of a shape falling outward in the lateral direction. Consequently, water in the intermediate portion of the upper surface of the roof in the lateral direction tends to gather in the drainage hole through the front ditch.

A fourth aspect is the passenger transport vehicle according to one of the first to the third aspects, wherein the drainage gutter includes a front ditch extending in a lateral direction at a front side of the upper surface, and a forward-backward ditch extending in the forward and backward direction on the upper surface, the front ditch being connected to the forward-backward ditch, and the drainage hole is at an intersection between the front ditch and the forward-backward ditch. This facilitates draining, directly through the drainage hole, water flowing through the front ditch and water flowing through the forward-backward ditch without the waters being merged in the drainage gutter.

A fifth aspect is the passenger transport vehicle according to the fourth aspect, wherein the forward-backward ditch is at each of right and left ends of the upper surface, and the front ditch is of a shape falling from an intermediate portion in the lateral direction toward outside right and left portions in the lateral direction. Consequently, water in the intermediate portion of the upper surface of the roof in the lateral direction tends to gather in the two right and left drainage holes through the front ditch.

A sixth aspect is the passenger transport vehicle according to one of the first to the fifth aspects which further includes a drainage channel extending from the drainage hole to a lower portion in the body. This facilitates flow of water on the roof from the drainage hole to the lower portion in the body through the drainage channel.

A seventh aspect is the passenger transport vehicle according to the sixth aspect which further includes a front strut with a tubular shape, the front strut coupling the body to the roof, wherein an inner surface of the front strut is a wall of the drainage channel. This saves providing another drainage channel separately from the strut.

An eighth aspect is the passenger transport vehicle according to the sixth or the seventh aspect, wherein an upper end of the drainage channel is connected to the drainage hole, and the upper end is inclined with respect to a vertical direction. This facilitates increasing an area of the upper opening of the drainage channel and improving the drainage performance more than those when the upper end of the drainage channel extends in the vertical direction.

A ninth aspect is the passenger transport vehicle according to one of the sixth to the eighth aspects, wherein the drainage channel includes a bent channel. This can weaken the momentum of water through the drainage channel.

A tenth aspect is the passenger transport vehicle according to one of the sixth to the ninth aspects, wherein the drainage channel includes a lower opening in space accommodating wheels, and the body includes a panel covering behind the lower opening. This hardly splashes water drained out of the drainage channel onto passengers.

An eleventh aspect is the passenger transport vehicle according to the tenth aspect, wherein the body includes a fender located outside the drainage channel in a lateral direction. Consequently, the fender hides the drainage channel.

A twelfth aspect is the passenger transport vehicle according to the eleventh aspect, wherein the body includes a hood located inside the fender in the lateral direction, the hood and the fender being separate parts, and the drainage channel passes between the hood and the fender. This facilitates disposing the drainage channel extending lower than the hood.

A thirteenth aspect is the passenger transport vehicle according to one of the sixth to the twelfth aspects, wherein the drainage gutter includes a forward-backward ditch extending in the forward and backward direction on the upper surface, the drainage hole is at a front of the forward-backward ditch, the forward-backward ditch is of a shape falling frontward, and an upper portion of the drainage channel extends forward and downward from the drainage hole. This facilitates moving water entering the drainage hole through the forward-backward ditch into the drainage channel.

A fourteenth aspect is the passenger transport vehicle according to one of the first to the thirteenth aspects, wherein a front portion of the roof is lower than a rear portion of the roof. Consequently, water on the upper surface of the roof tends to gather toward the front with the drainage hole on the roof.

A fifteenth aspect is the passenger transport vehicle according to one of the first to the fourteenth aspects, wherein the roof has a forward-tilted shape or a horizontal shape when the roof is observed along a lateral direction. Consequently, water on the upper surface of the roof tends to gather toward the front with the drainage hole on the roof.

The foregoing description is in all aspects illustrative and does not restrict this invention. Numerous modifications and variations that have not yet been exemplified are devised without departing from the scope of this invention.

What is claimed is:

1. A passenger transport vehicle, comprising:

a body; and a roof on which a drainage gutter and a drainage hole are formed, the roof being supported above the body and including an upper surface and a lower surface, the drainage gutter including a front portion in front of a center of the upper surface in a forward and backward direction, the drainage hole being formed on the front portion to reach the lower surface from a bottom of the drainage gutter, wherein the drainage gutter includes a front ditch extending in a lateral direction at a front side of the upper surface, the drainage hole is located closer to an outside portion of the front ditch in the lateral direction than to the center of the front ditch, the front ditch is of a shape falling outward in the lateral direction, a drainage channel extending from the drainage hole to a lower portion in the body, and a front strut with a tubular shape, the front strut coupling the body to the roof, wherein an inner surface of the front strut is a wall of the drainage channel, and wherein the front strut includes a right strut and a left strut independent from each other in a right-left direction, the right strut or the left strut includes a pipe, and an upper-end opening of the pipe is connected to the drainage hole.

2. The passenger transport vehicle according to claim 1, wherein the drainage gutter includes a forward-backward ditch extending in the forward and backward direction on the upper surface, the drainage hole is at a front of the forward-backward ditch, and the forward-backward ditch is of a shape falling frontward.

3. The passenger transport vehicle according to claim 1, wherein the drainage gutter includes the front ditch extending in a lateral direction at a front side of the upper surface, and a forward-backward ditch extending in the forward and backward direction on the upper surface, the front ditch being connected to the forward-backward ditch, and the drainage hole is at an intersection between the front ditch and the forward-backward ditch.

4. The passenger transport vehicle according to claim 3, wherein the forward-backward ditch is at each of right and left ends of the upper surface, and the front ditch is of a shape falling from an intermediate portion in the lateral direction toward outside right and left portions in the lateral direction.

5. The passenger transport vehicle according to claim 1, wherein an upper end of the drainage channel is connected to the drainage hole, and the upper end is inclined with respect to a vertical direction.

6. The passenger transport vehicle according to claim 1, wherein the drainage channel includes a bent channel.

7. The passenger transport vehicle according to claim 1, wherein the drainage channel includes a lower opening in space accommodating wheels, and the body includes a panel covering behind the lower opening.

8. The passenger transport vehicle according to claim 1, wherein the body includes a fender located outside the drainage channel in a lateral direction.

9. The passenger transport vehicle according to claim 8, wherein the body includes a hood located inside the fender in the lateral direction, the hood and the fender being separate parts, and the drainage channel passes between the hood and the fender.

10. The passenger transport vehicle according to claim 1, wherein the drainage gutter includes a forward-backward ditch extending in the forward and backward direction on the upper surface, the drainage hole is at a front of the forward-backward ditch, the forward-backward ditch is of a shape falling frontward, and an upper portion of the drainage channel extends forward and downward from the drainage hole.

11. The passenger transport vehicle according to claim 1, wherein a front portion of the roof is lower than a rear portion of the roof.

12. The passenger transport vehicle according to claim 1, wherein the roof has a forward-tilted shape or a horizontal shape when the roof is observed along a lateral direction.

13. A passenger transport vehicle, comprising:

a body, a roof on which a drainage gutter and a drainage hole are formed, the roof being supported above the body and including an upper surface and a lower surface, the drainage gutter including a front portion in front of a center of the upper surface in a forward and backward direction, the drainage hole being formed on the front portion to reach the lower surface from a bottom of the drainage gutter; and a drainage channel extending from the drainage hole to a lower portion in the body, wherein the drainage channel includes a lower opening in space accommodating wheels, and the body includes a panel covering behind the lower opening.

14. The passenger transport vehicle according to claim 3, wherein in a cross-sectional view taken through the drainage hole and perpendicular to the forward and backward direction, the drainage hole is located at a position where the drainage hole overlaps the forward-backward ditch in the right-left direction.

* * * * *